Oct. 22, 1957  P. GEIBEL  2,810,464
CLUTCH DISENGAGING RING
Filed Jan. 10, 1956
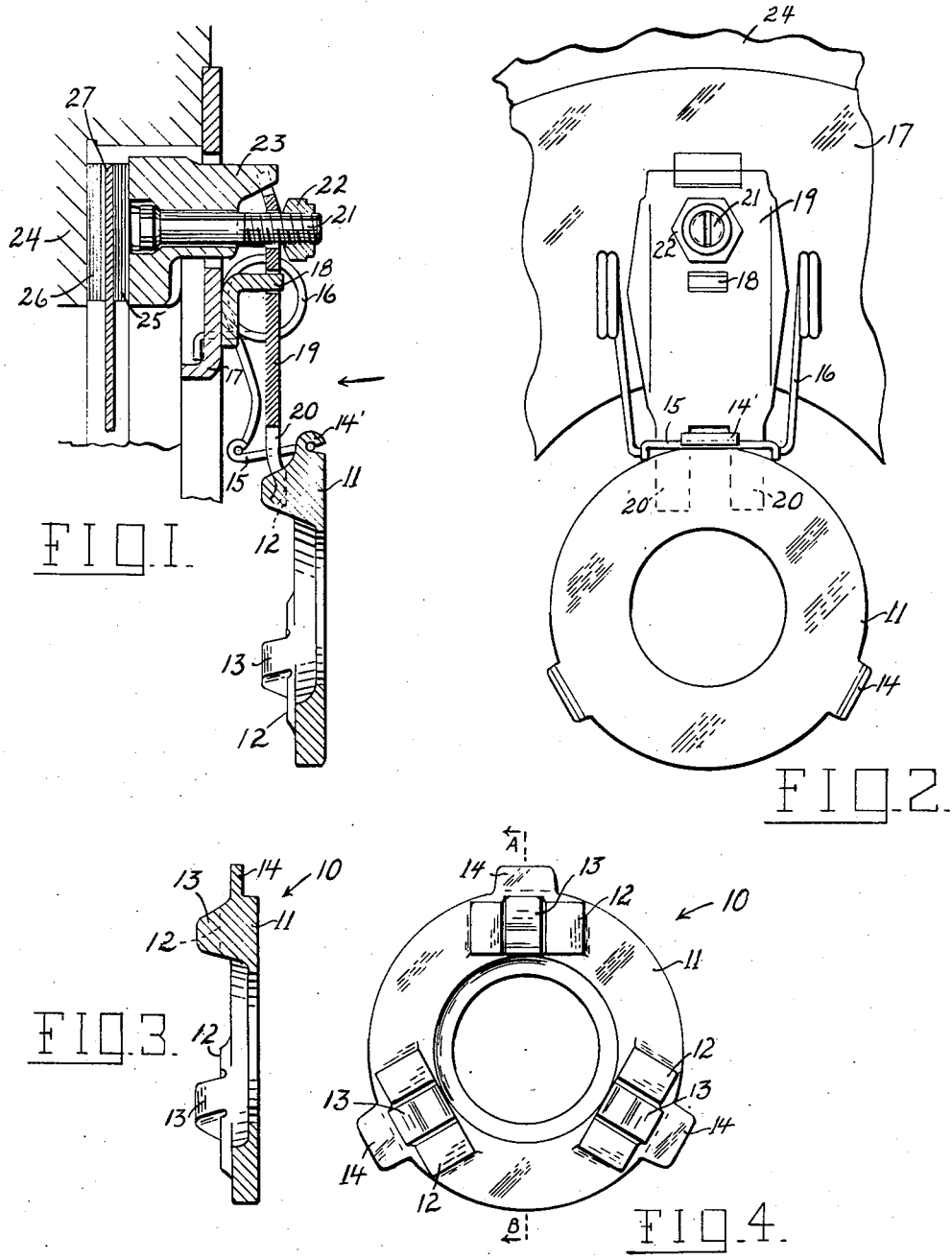
INVENTOR:
PETER GEIBEL
BY
Richardson, David and Nordon
ATTORNEYS.

United States Patent Office 2,810,464
Patented Oct. 22, 1957

2,810,464

CLUTCH DISENGAGING RING

Peter Geibel, Schweinfurt, Germany, assignor to Firma Fichtel & Sachs A. G., Schweinfurt (Main), Germany, a corporation of Germany Application January 10, 1956, Serial No. 558,345

Claims priority, application Germany January 19, 1955

2 Claims. (Cl. 192—109)

The present invention relates to the formation of a novel disengaging ring for the clutch of a motor vehicle or the like. More particularly, it relates to the formation of a novel ring which cooperates with clutch disengaging levers for effecting disengagement of the clutch.

Friction clutches include a pressure plate which is capable of displacement toward the flywheel of the motor to thereby clamp a friction disc for causing rotation of the driven shaft. Levers are provided on the pressure plate, pivoting of the levers causing displacement of the plate away from the flywheel and thus disengaging the clutch. To effect pivoting of these levers in disengagement, a disengaging ring may be provided which abuts against one end of all the clutch levers.

Such disengaging rings may be made of cast iron or even of steel and on the one hand are secured to the ends of the clutch levers and on the other hand abut against a disengaging bearing which is either a graphite ring or a ball bearing. To keep the disengaging ring under tension with the lever system of the clutch, the ring is provided on its outer periphery with hook-like lugs or ears each having a groove or recess into which the central portion of a stirrup extends while the ends of the stirrup are supported on a spring carried by the clutch housing.

The disengaging ring is conventionally cast with the hook-like lugs or ears but when steel rings are employed it is necessary to form the hook-like lugs by machining. Even with castings, however, difficulties are encountered since it is not possible to provide undercut surfaces and the cast hook does not provide sufficient safety because the great centrifugal force created when operating the engine at high speeds sometimes causes the stirrup to jump out of its seat in the recess or groove of the lug.

It is accordingly an object of the present invention to provide a disengaging ring for a clutch, which ring can be easily manufactured without machining.

A further object of the invention is to provide a novel clutch disengaging ring which can be cast and then finished without machining.

Another object of the present invention is to provide a clutch disengaging ring having bearings operatively connected with the clutch disengaging levers even at extremely high speeds which generate correspondingly high centrifugal forces.

Yet another object of the present invention is to provide a clutch disengaging ring having a bearing which retains a stirrup, connected with a return spring, in such manner that the stirrup cannot become accidentally disengaged from the ear.

These and other objects and advantages are realized in accordance with the present invention which will be described more fully with reference to a preferred embodiment shown in the accompanying drawing wherein:

Fig. 1 is a vertical section through a clutch disengaging ring in accordance with the present invention, the figure also showing the connection between the novel ring, the clutch lever and the return spring;

Fig. 2 is a view of the novel ring as seen from the right-hand side of Fig. 1;

Fig. 3 is a vertical section through a novel ring in an intermediate stage of its manufacture; and Fig. 4 is a view taken from the right-hand side of Fig. 3.

Referring now more particularly to the drawing, a casting of the disengaging ring 10 is first made having the configuration shown in Figs. 3 and 4. This casting includes an annular base 11 provided with three raised portions 12 each divided by a central nose 13 into two thrust surfaces. Adjacent each nose 13 on the periphery of the base 11 there is formed a thin, straight radial lug or projection 14.

The lugs or projections 14 are forged to permit deformation thereof and after forging, a U-shaped stirrup 15 is positioned rearwardly of each lug 14 and the lug is then bent around the cross bar of said stirrup into a tubular bearing 14', leaving a narrow slot therealong as shown in Figs. 1 and 2. The slot in the bearing is of such narrow width that the stirrup cannot jump to the right as viewed in Fig. 1 and thus leave the recess in which it seats.

The stirrup 15 is provided with ends which are curled around the cross-bar of a U-shaped spring 16, the latter being anchored to the clutch housing cover 17. The cover 17 also carries a fulcrum member 18 which extends into a rectangular aperture provided in clutch lever 19 the latter having a bifurcated lower end fitting over nose 13, the bifurcations 20 resting on the two thrust surfaces of raised portion 12.

The other end of each clutch lever 19 has another aperture through which a swinging bolt 21 extends, the bolt also extending through an aperture provided in the clutch cover 17. One end of the bolt 21 is capped by a nut 22 while the other end is in operative engagement with the thrust plate 23 which carries friction facing 25. The flywheel 24 of the engine (not shown) is provided with a friction facing 26 and is secured to the clutch cover 17. An annular friction disc 27 is disposed between facings 25 and 26 and is connected with the engine drive shaft (not shown). Conventional clutch springs (not shown) urge the thrust plate 23 to the left into the position shown in Fig. 1 and thereby clamp the friction disc 27 between facings 25 and 26 so that the clutch is engaged. In order to disengage the clutch it is necessary to displace the thrust plate 23 to the right against the action of the clutch springs.

This is effected in the following manner:

The operator acts to shift the gears into neutral, i. e., to disengage the clutch. This action serves to displace a disengaging bearing (not shown) to the left so that the disengaging ring 10 is also displaced to the left in Fig. 1. The bifurcated end 20 of each clutch lever 19 is carried to the left together with the disengaging ring 10 and causes the lever 19 to pivot about fulcrum member 18 so that the other end of the clutch lever displaces nut 22 to the right. This carries the swinging bolt 21 to the right together with the thrust plate 23 so that friction facing 25 is moved away from disc 27 and the latter then ceases to rotate with the flywheel 24.

During disengagement when the disengaging ring 10 moves to the left the stirrup 15 moves therewith, thereby partially releasing the tension of the spring 16. The tension of the spring 16 is of course insufficient to pull the disengaging ring 10 to the left by itself against the much superior force of the clutch spring.

When the operator places the apparatus in gear the disengaging bearing (not shown) is moved to the right so that it no longer acts against the disengaging ring 10 and therefore the clutch springs (not shown) can re-engage the clutch by clamping disc 27 between facings 25 and 26, the elements mentioned above moving in the reverse directions from those followed during disengagement. As the bifurcated end 20 of lever 19 returns to the right it pushes disengaging ring 10 therewith.

Return of the disengaging ring 10 to the right entrains stirrup 15 by means of bearing 14' and this again tensions spring 16, the tension being insufficient to prevent the re-engagement since the force of the clutch springs (not shown) is far greater than the counter force of the return springs 16. Engagement of the clutch is thus restored. During this return movement, the spring 16 and stirrup 15 maintain continuous contact between clutch levers 19 and the disengaging ring 10.

In spite of rapid return of the disengaging ring 10 to its right-hand position as shown in Fig. 1, it is impossible for the stirrup to be bounced out of the opening in bearing 14' since the width of the slot in the bearing is insufficient to permit passage of the stirrup therethrough. Under high centrifugal force it is also impossible for the stirrup to leave its seat for the same reason, the bearing having been turned in after placing of the stirrup behind the flange.

In contrast therewith, it would not be possible to make a casting with a tubular bearing already provided with a slot therealong of smaller width than the diameter of the opening of the bearing. The casting of a flat flange in place of a tubular bearing thus facilitates casting and the subsequent turning in of the flange prevents accidental disengagement of the stirrup from the tubular bearing.

The novel disengaging ring and its method of manufacture also avoid the difficulties which would be encountered if the entire ring were made of steel and machining had to be employed to form the novel-shaped bearing.

Accordingly, in simple manner a disengaging ring has been provided which avoids the difficulties of working with steel. While taking advantage of the ease of making castings, the novel technique eliminates the shortcomings attending use of cast rings, viz., their proneness to unintentional disengagement from the stirrup.

Various changes and modifications may be made without departing from the spirit and scope of the present invention and it is intended that such obvious changes and modifications be embraced by the annexed claims.

What I claim is:

1. The method for securing a clutch to a disengaging ring therefor, said clutch including levers, springs and U-shaped stirrups operatively connected with said springs, said method comprising the steps of forming a disengaging ring blank with an annular base provided with a plurality of means for engagement with said levers and with flat malleable lugs projecting outwardly in the plane of the base, positioning the bight portion of a stirrup behind a respective flat lug remote from the respective axial projection, and then bending said lug about said bight portion of the stirrup to enclose the latter, said enclosure having a slot therealong narrower than the diameter of said stirrup.

2. The method of securing a disengaging ring to a clutch, said ring having flat lugs projecting from the periphery thereof in the plane of the annular body thereof, said clutch having U-shaped stirrups, said method consisting of placing the bight portions of the U-shaped stirrups on the surfaces of the flat lugs and then bending the flat lugs around such bight portions of the stirrups a distance slightly more than the diameter of the bight portions thereby leaving a slot therealong having a width less than the diameter of the enclosed bight portions of the stirrups for retaining said stirrups in position.

References Cited in the file of this patent

UNITED STATES PATENTS

| 2,037,610 | Worner | Apr. 14, 1936 |

FOREIGN PATENTS

| 370,218 | Great Britain | Apr. 7, 1932 |
| 375,362 | Great Britain | June 24, 1932 |
| 538,464 | Great Britain | Aug. 5, 1941 |